United States Patent [19]
Yamashita et al.

[11] Patent Number: 5,907,744
[45] Date of Patent: May 25, 1999

[54] IMAGE FORMING APPARATUS CAPABLE OF HANDLING MIXED ORIGINALS EASILY

[75] Inventors: Toshiyuki Yamashita; Eiichi Yoshida; Hiroharu Tanaka, all of Toyokawa; Takatsugu Kuno, Aichi-Ken; Sumiko Nishimura, Toyohashi, all of Japan

[73] Assignee: Minolta Co., Ltd., Osaka, Japan

[21] Appl. No.: 08/947,332

[22] Filed: Oct. 8, 1997

[30] Foreign Application Priority Data

Mar. 11, 1997 [JP] Japan ................................ 9-056403

[51] Int. Cl.$^6$ .................................................. G03G 15/00
[52] U.S. Cl. ........................................ 399/85; 399/370
[58] Field of Search ............................... 399/370, 82, 85, 399/86, 87

[56] References Cited

U.S. PATENT DOCUMENTS 4,078,787   3/1978   Burlew et al. .
4,536,078   8/1985   Ziehm .
5,722,031   2/1998   Fujii et al. ........................ 399/410
5,740,497   4/1998   Yamada et al. ................... 399/87

FOREIGN PATENT DOCUMENTS 4-242762   8/1992   Japan .
08044252   2/1996   Japan .

*Primary Examiner*—Richard Moses
*Attorney, Agent, or Firm*—McDermott, Will & Emery

[57] ABSTRACT

In an image forming apparatus, first in a printing delay process, it is determined whether or not a specific mode is set. When it is determined that a specific mode is set, printing is inhibited until images to be printed are accumulated in a memory, and whether or not originals are mixed originals (of assorted sizes) is detected. If it is determined that originals are mixed ones, start of printing is inhibited. Since printing cannot be executed when a specific mode in which mixed originals cannot be handled is set, an image forming apparatus capable of automatically handling mixed originals can be provided.

13 Claims, 15 Drawing Sheets

F I G. 5
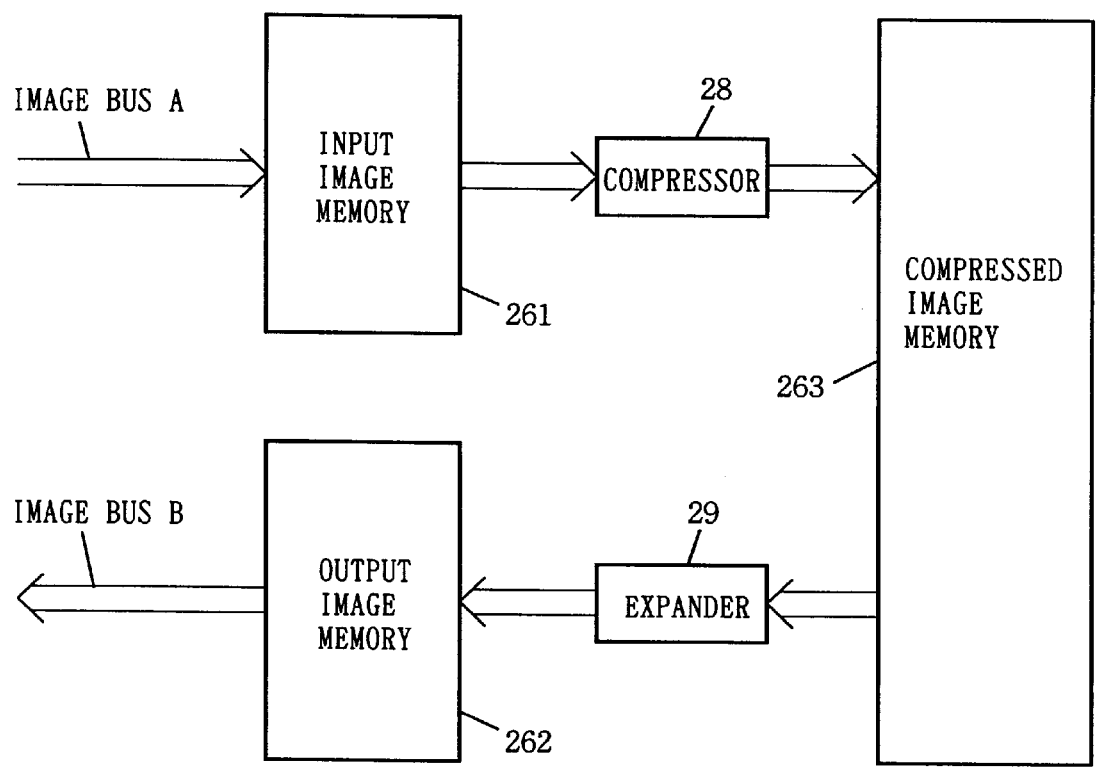

IMAGE FORMING APPARATUS CAPABLE OF HANDLING MIXED ORIGINALS EASILY

BACKGROUND OF THE INVENTION

1. Field of the Invention

The present invention relates to an image forming apparatus which inputs an image of an original document supplied from an image reader as well as externally connected facsimile device, personal computer, and the like and prints it out, and more particularly relates to an image forming apparatus capable of forming an image in multiple modes.

2. Description of the Related Art

In a general copying machine, when mixed originals are to be copied, the copying operation is started after a user sets if the originals are of assorted sizes in advance, or the copying operation is started after all sizes of the originals are acknowledged by an automatic document feeder placed at the upper part of the copying machine. The mixed originals here refer to originals including at least one original which has a distance measured lengthwise or widthwise which is different from that of other originals.

On the other hand, in a printer and a facsimile device, it is actually impossible to detect whether originals to be printed are mixed or not. However, the printer and facsimile device have a mode which cannot be executed for the mixed originals as described below. In such a case, output is inhibited by application software.

The modes which cannot be executed for the mixed originals are as follows.

Alternate paper feeding: a function equivalent to the sorting function is achieved without a sorting unit (sorter) by changing the direction of discharging sheets of the same size for each batch of sheets to be printed. Generally all original images should have the same size, otherwise the zoom ratio should be changed for images of different sizes, that is, the variable scale magnification should be applied to those images for achieving the alternate paper feeding. In this case, an application which calculates a ratio of the variable scale magnification for each original image size is necessary. The ratio of variable scale magnification should be suitable for designated sheet size.

N in 1: images of a plurality of original documents are placed on one sheet having a certain size by magnifying (generally reducing) images of the same size on a variable scale and arranging the images included in a plurality of pages to be printed. In this mode, it is necessary to have original images of the same size to be printed on one page.

Duplex mode: different images are respectively printed on both sides of a sheet having a certain size. As in the alternate paper feeding, generally original images should have the same size. Otherwise, an application which magnifies original images on a variable scale according to the sheet size is required.

Stapling: one of functions of the sorting unit (sorter, finisher). A plurality of sheets to which sorting or the grouping operation is applied are stapled and finished for each batch of sheets. Generally, in order to enhance alignment of the edge surfaces of sheets after stapling, the sheets are aligned by pressing a member against the edge surfaces of the sheets prior to the stapling operation. The alignment method may depend on the structure of the finishing unit. In order to execute the alignment operation, in at least the direction of discharging sheets or in a direction perpendicular to the discharging direction, or in both directions, the sheets should have the same size.

In a conventional image forming apparatus, a user should designate an operation of a printer when mixed originals are to be printed. In the mode which cannot be executed for the mixed originals, a printer is prevented from outputting. Therefore, in order to make prints of mixed originals, intervention by a user is required.

SUMMARY OF THE INVENTION

One object of the present invention is to provide an image forming apparatus capable of handling mixed originals easily.

Another object of the invention is to provide an image forming apparatus capable of automatically handling mixed originals.

Still another object of the invention is to reduce situations in which a user intervenes in an operation of an image forming apparatus.

Still another object of the invention is to effectively use a memory in an image forming apparatus.

A further object of the invention is to provide a method of forming an image in which mixed originals are automatically handled.

Above objects of the invention are achieved by providing an image forming apparatus with components below. An image forming apparatus according to the present invention includes an input unit which inputs an image of an original, a memory which stores an image input from the input unit, a detection unit which detects a size of an input original, an output unit which outputs an image stored in the memory, a setting unit which sets a first mode and a second mode for the output unit, and a controller which controls an operation of the output unit based on a result of the detection by the detection unit and a mode set by the setting unit.

Since an operation of the output unit which outputs an image according to the detected original size and the set mode is controlled, mixed originals are automatically handled.

Preferably, when the second mode concerned with a specific process is set, the controller stops an operation of the output unit until all of the sizes of input originals are detected by the detection unit.

Since an image is never output until all of the original sizes are detected when the second mode having process details related to a specific process is set, useless outputting of an image can be prevented.

Still preferably, the controller starts an operation of the output unit when all of the detected original sizes are equivalent.

Since an operation of the output unit is started when all of the detected original sizes are equivalent, intervention by a user can be reduced in an image forming apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a block diagram showing the main part of an image RAM.

DESCRIPTION OF THE PREFERRED EMBODIMENTS

Embodiments of the present invention are described below referring to the figures.

Figure 1:
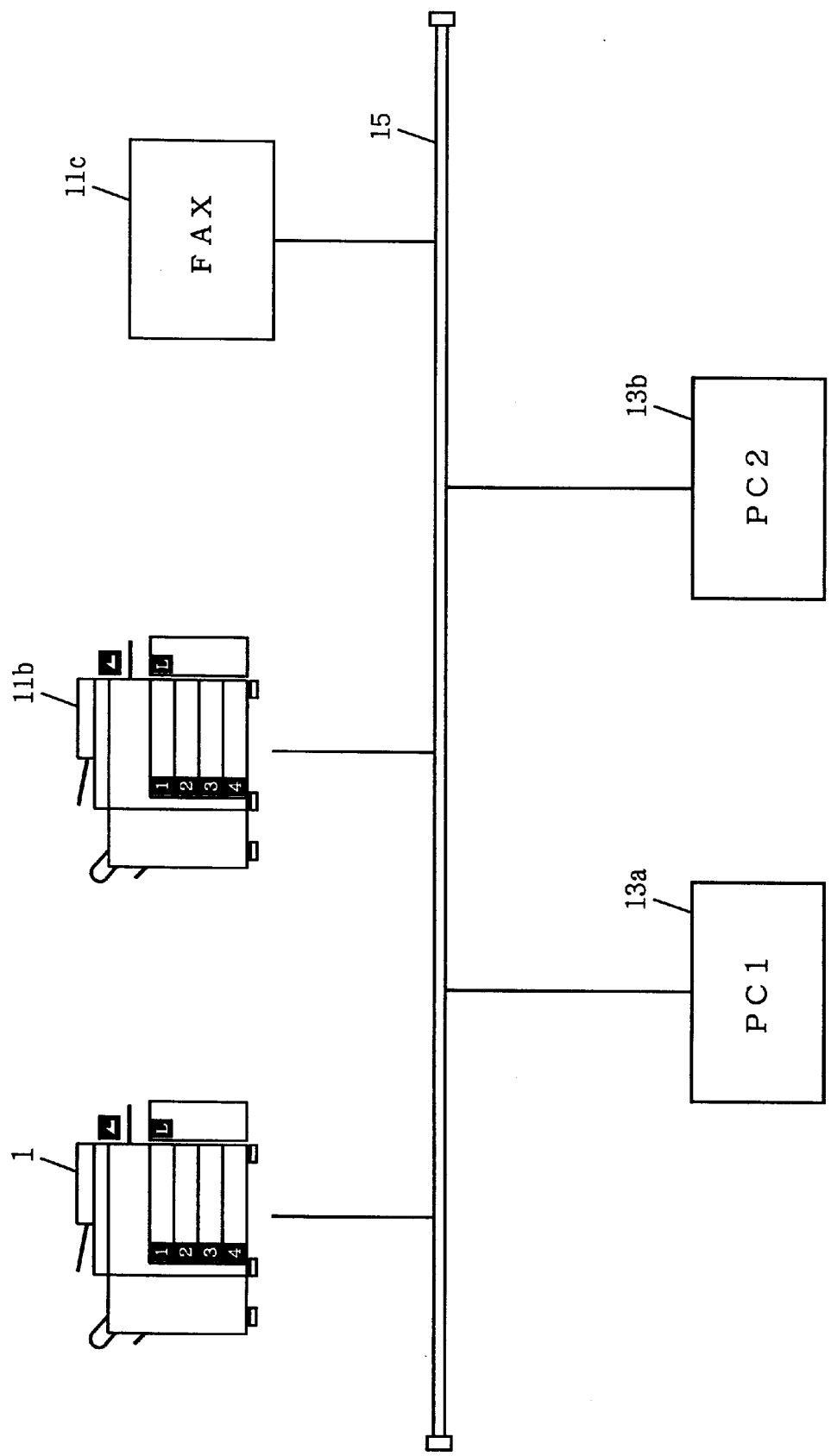
FIG. 1 shows a model of a network in which a digital copying machine according to one embodiment of the invention is connected.

FIG. 1 shows a model for describing how a digital copying machine 1 as one embodiment of an image forming apparatus according to the present invention is actually used. Referring to FIG. 1, a digital copying machine 1 according to the invention is connected to another digital copying machine 11b, a facsimile device 11c, and personal computers 13a and 13b through an external bus 15. Digital copying machine 1 receives image data output from another facsimile device 11c, personal computers 13a and 13b and outputs the data.

Figure 2:
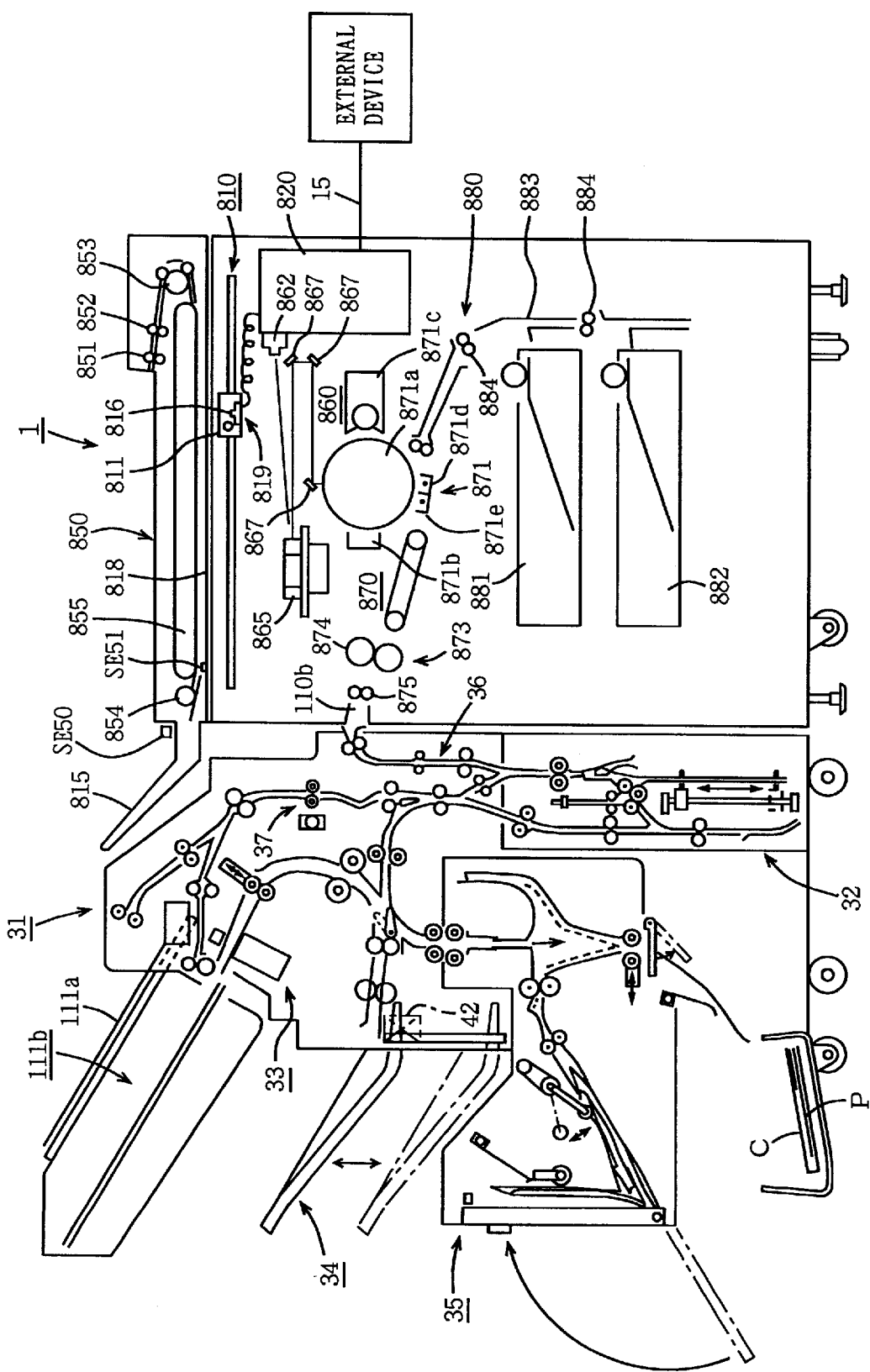
FIG. 2 is a front cross sectional view of a digital copying machine according to one embodiment of the invention.
Figure 3:
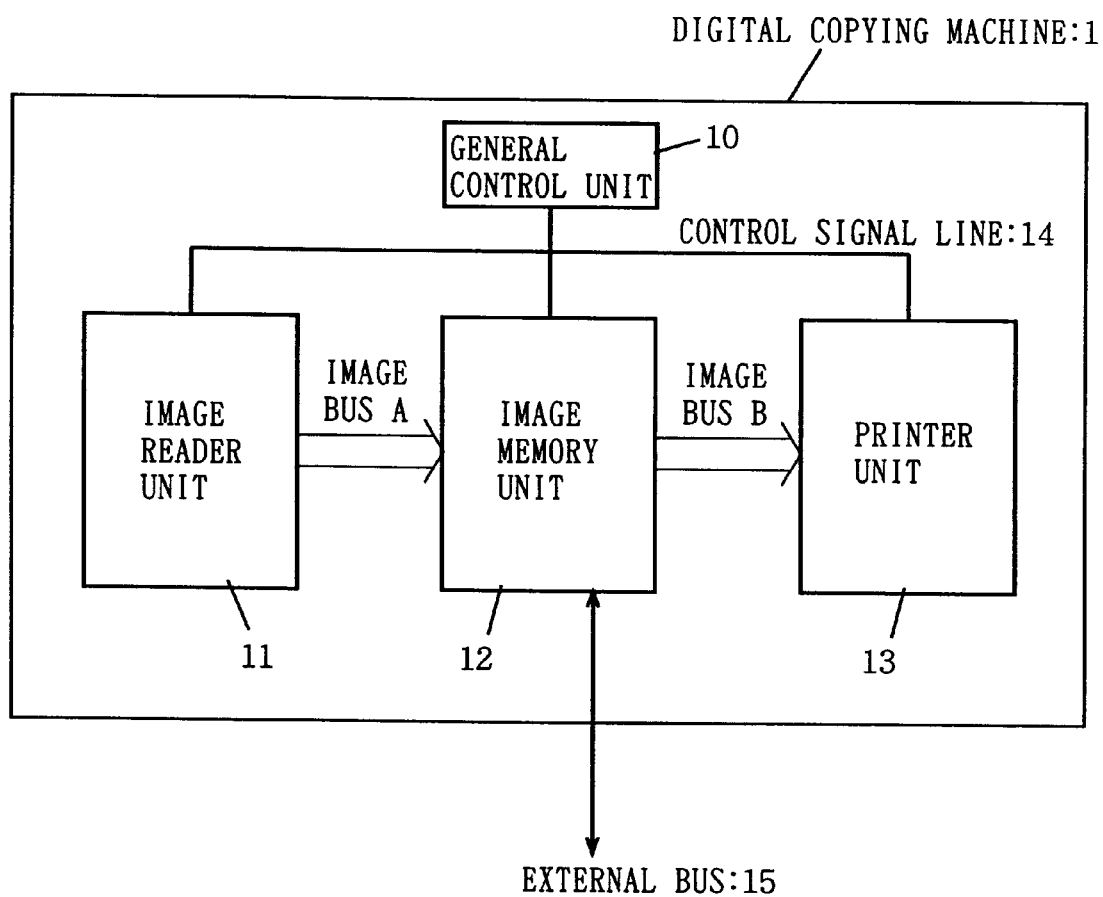
FIG. 3 is a block diagram showing the main part of a digital copying machine.

FIG. 2 is a schematic cross sectional view for describing an entire structure of digital copying machine 1, and FIG. 3 is a block diagram of its main part.

Referring to FIGS. 2 and 3, digital copying machine 1 is generally constituted by an image reader 11 including a scan system 810 which reads an original to be copied, an image memory unit 12 including an image signal processing unit 820 which processes the read image data, and a printer unit 13 including a laser optical system 860 and image formation system 870 for outputting the read image data onto a sheet. An ADF (Automatic Document Feeder) 850 which transports an original to be copied and reverses the original if necessary is located at the upper part of digital copying machine 1. An operation panel OP for setting an operation mode for various image compile processes carried out in digital copying machine 1 as well as the number of copies to be made is provided at the upper surface of digital copying machine 1.

The copying machine is further provided with a finisher 31 including a binding unit, a paper folding unit, a punching unit, and a stapling unit as described below.

A function and an operation of each unit of digital copying machine 1 are hereinafter described in detail.

An original set on an original tray 815 of ADF 850 is transported to a prescribed position on an original support table (platen glass) 818 one by one according to an instruction by a CPU for ADF. The original is discharged to a discharge tray on ADF 850 after read by scan system 810. Each of original transport system rollers 851, 852, 853 and 854 as well as a transport belt 855 of ADF are driven to transport the original.

When an original is transported, the size of the original is detected one by one according to the time of turning on/off of a sensor SE51 located in ADF 850. A signal from sensor SE51 is transmitted to a CPU for the copying machine (not shown) via the CPU for ADF (not shown). A sensor SE50 detects whether or not an original is present on original tray 815.

In scan system 810, a scanner 819 is driven by a scan motor (not shown). Scanner 819 moves under platen glass 818. Light emitted from an exposure lamp 811 attached to scanner 819 is directed onto an original placed on platen glass 818. The reflected light is received by a CCD 816 which is a photoelectric conversion element, and an image of the original is scanned and read.

Laser optical system 860 is constituted by a semiconductor laser 862, a polygon mirror 865 which polarizes the laser beam, and a reflection mirror 867. Image formation system 870 is constituted by a development transfer system 871, a transport system 880 which transports a sheet, and a fixing system 873 which fixes an image. Development transfer system 871 is constituted by a photoreceptor drum 871a, a corona charger 871b, a developing unit 871c which holds a developer and supplies toner to the photoreceptor drum, a transfer charger which transfers a toner image on the photoreceptor drum onto a sheet, a separation charger 871e which separates a sheet from the photoreceptor drum, and a cleaning plate (not shown) which removes unnecessary toner.

Transport system 880 is constituted by cassettes 881 and 882 which hold sheets, a sheet guide 883, a timing roller 884 and the like. The size of the sheets contained in sheet cassettes 881 and 882 is determined for each sheet cassette in advance, and a size of a sheet is determined for each cassette. Although two sheet cassettes are illustrated in the figure, the number of sheet cassettes may be more than two.

Fixing system 873 is constituted by a fixing roller 874 which transports a sheet while executing the thermocompression bonding for the sheet, a discharge roller 875, and a discharge sensor (not shown) which detects discharging of a sheet.

A sheet which has been printed out is transported from a discharge portion 110b to finisher 31 described below.

As shown in FIG. 2, finisher 31 is generally constituted by a non-sort tray 111a and a sheet collecting unit 111b that collect and align sheets P discharged from discharge portion 110b in digital copying machine 1, a paper folding unit 32 which folds a sheet P discharged from discharge portion 110b in half or into Z shape (hereinafter referred to as Z folding) as needed, a stapling unit 33 located at the downstream side of a direction of sheet transportation from sheet collecting unit 111b which carries out a stapling process for the collected and aligned sheets P, a sorting unit 34 which contains a discharged bundle of sheets to which the stapling process is applied, a binding unit 35 which attaches a cover to the stapled bundle of sheets or a bundle of sheets which is not stapled, and a punching unit 37 located in a path of sheet transportation which makes a hole in a sheet as needed. A sheet discharged from digital copying machine 1 is transported to each part in the finisher by a sheet transport unit 36.

FIG. 3 is a block diagram showing the main part of digital copying machine 1 in FIG. 2. With reference to FIG. 3, digital copying machine 1 includes an image reader unit 11, an image memory unit 12, and a printer unit 13 connected by a control signal line 14 with each other. Image data from image reader unit 11 is transmitted to image memory unit 12 via an image bus A, and image data stored in image memory unit 12 is transmitted to printer unit 13 via an image bus B. External bus 15 described with reference to FIG. 1 is connected to image memory unit 12.

Figure 4:
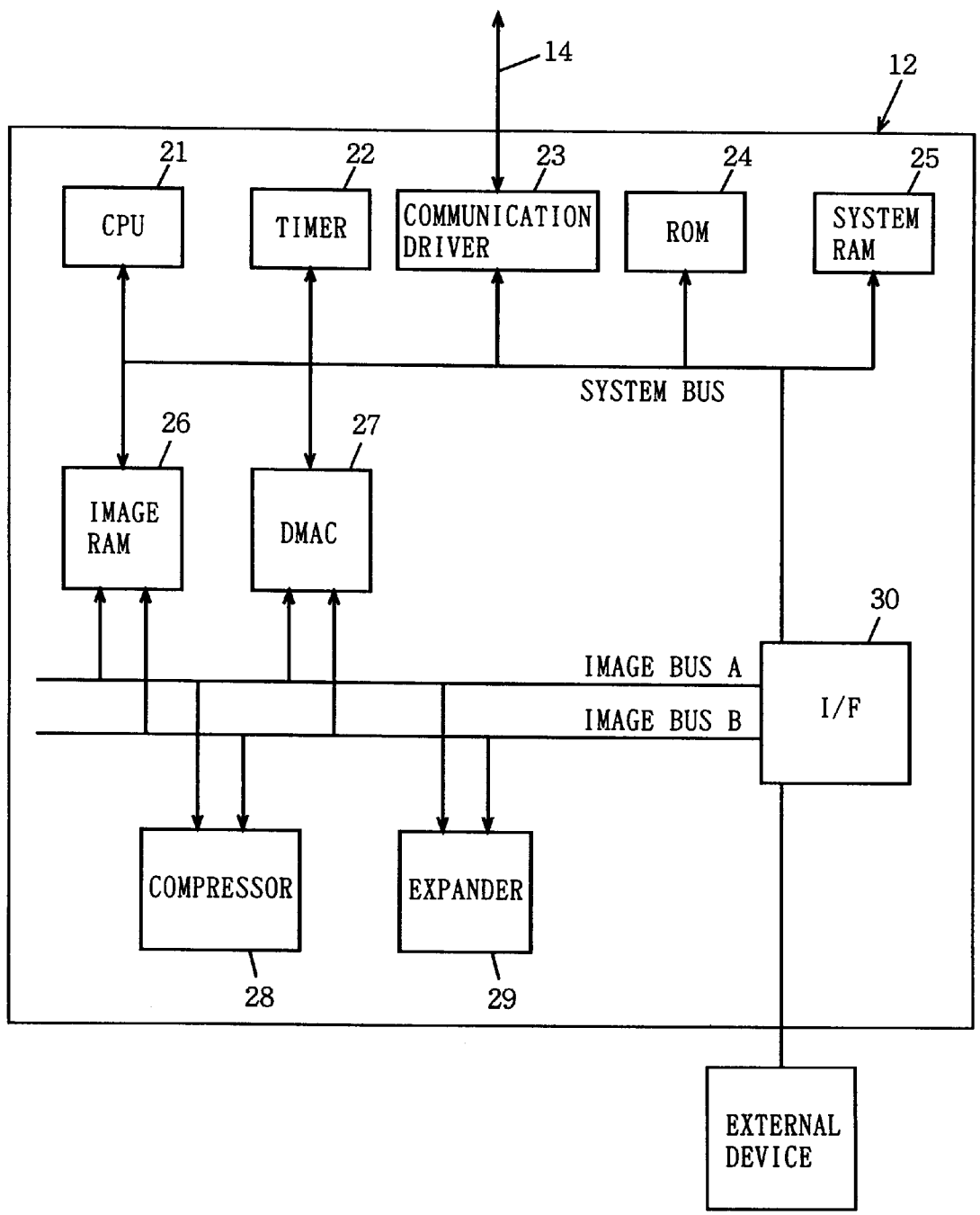
FIG. 4 is a block diagram showing the main part of an image memory unit.

FIG. 4 is a block diagram showing an internal structure of image memory unit 12. Referring to FIG. 4, in image memory unit 12, a CPU 21 carries out the control according to a procedure of a program stored in an ROM 24. Image memory unit 12 communicates with image reader unit 11, printer unit 13 and a general control unit 10 via a communication driver 23 and through control signal line 14. In addition, image memory unit 12 can communicate with an external device described in FIG. 3 via an interface 30 and external bus 15.

Image bus A and image bus B are connected to an image RAM 26 in which image data is stored. Transfer of image data is controlled by a DMAC (Dynamic Memory Access Control) 27 capable of transfer of several channels. To image bus A and image bus B, a compressor 28 and an expander 29 are respectively connected that enable a compressing and expanding operation. Information on image data stored in image RAM 26 is stored in a system RAM 25. Further, system RAM 25 stores a parameter necessary for executing a program.

FIG. 5 is a block diagram showing the flow of data in image memory unit 12. Image RAM 26 is divided into an input image memory 261, an output image memory 262, and a compressed image memory 263. Data is transferred between respective memories by DMAC 27 shown in FIG 4. Image data is transferred by specifying a transfer address and a transfer size in DMAC 27. By reading a transfer counter of DMAC 27, a position in a memory to which image data is transferred can be confirmed.

Image data read from image reader unit 11 is stored in input image memory 261 through image bus A. As described above, by reading the transfer counter of DMAC 27, a line in input image memory 261 to which image data is input can be confirmed. Image data stored in input image memory 261 is compressed by compressor 28 and transferred to compressed image memory 263 again through image bus A. Image data in compressed image memory 263 is transferred to expander 29 through image bus B, and expanded image data is transferred to output image memory 262 again through image bus B.

The image data transferred to output image memory 262 is transferred to printer unit 13 through image bus B by DMAC 27, and an image is printed on a sheet. By reading the transfer counter of DMAC 27, a position in output image memory 262 including image data transferred to printer unit 13 can be known. In other words, the amount of image data transferred from the output image memory to printer unit 13 can be confirmed.

Description of a copying process for an image is given below. Image data read from image reader unit 11 is stored in input image memory 261. When a definite amount of image data are read, the data is compressed by compressor 28 and compressed image data is transferred to compressed image memory 263. The compressed image data is transferred to output image memory 262 which is a page memory through expander 29, and the original image data can be reproduced. The image data is then transferred to printer unit 13 through image bus B to print the read image. In order to compose additional information on the page, date and the like to be printed, additional information corresponding to an image and image data expanded by expander 29 are composed by superimposing them on each other in output image memory 262.

Compressed image memory 263 can store image data of a plurality of originals. Therefore, the memory can be utilized for the sorting using the function described above. First a plurality of originals are successively read. When image data is read into input image memory 261, the image data is compressed by compressor 28, and the compressed image data is stored in compressed image memory 263. This operation is repeated and all of the image data of images of a plurality of originals are stored in compressed image memory 263. After this process, expander 29 expands image data of an original of the first page to that of the nth page successively, and the image data is transferred to output image memory 262 to be transferred to printer unit 13. By repeating this expansion and output necessary times, images to be copied can be output for each batch of documents. Accordingly, the memory is capable of sorting which has been mechanically carried out.

Compressed image memory 263 can store a plurality of images, and a compression image management table is provided in system RAM 25 for managing these images. The management table stores information for each image. The information for each image such as the size of an image before compression, a pointer indicating where the compression image is stored in the compressed image memory, compression size, compression time, the size of read original, which page of consecutive originals, and the like are stored.

Figure 6:
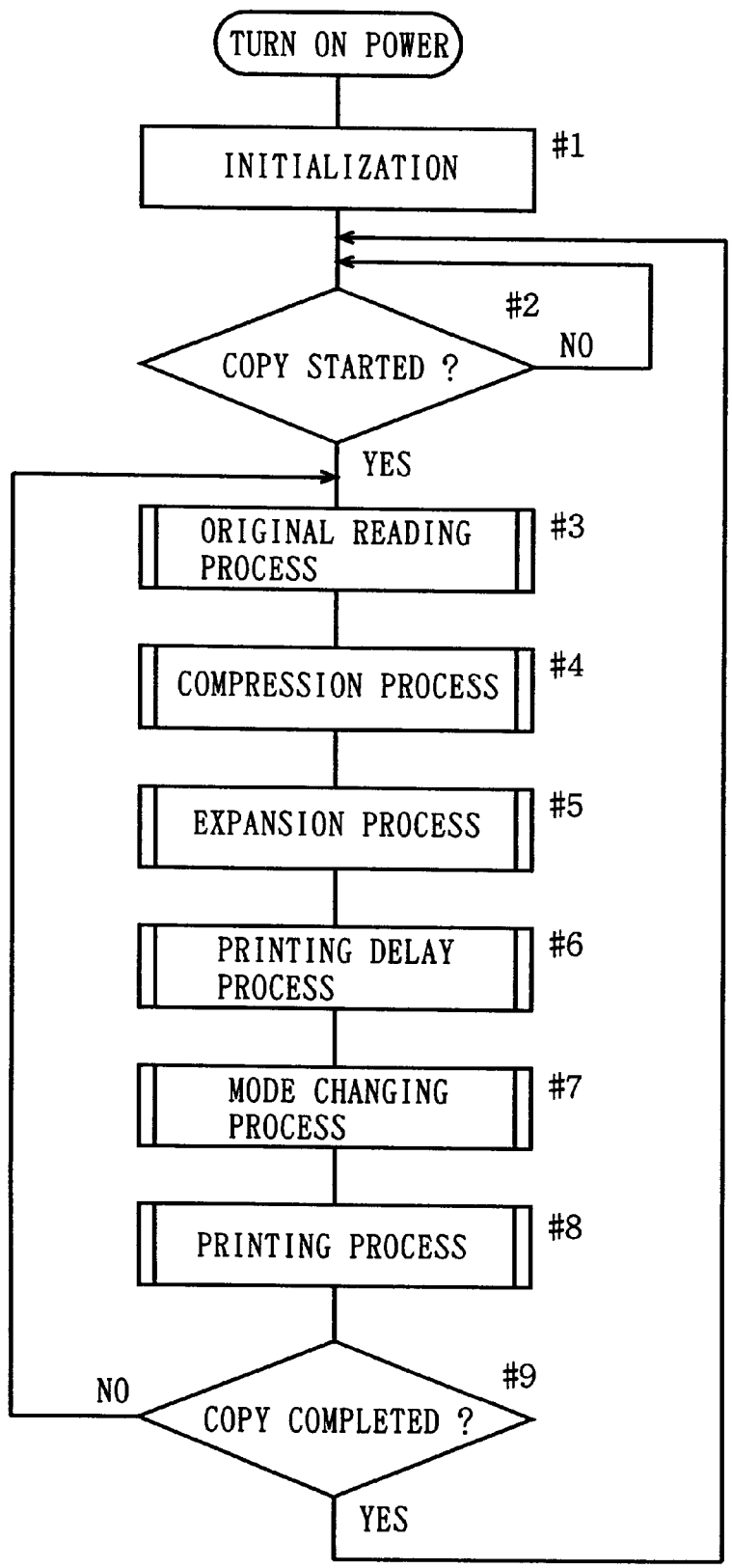
FIG. 6 is a flow chart showing a main routine indicating an operation of a digital copying machine.

An operation of the digital copying machine according to the present invention is described below. FIG. 6 is a flow chart showing a main routine of the digital copying machine. Referring to FIG. 6, a state such as an internal status is initialized after the power supply is turned on (#1). This process loops in a waiting state until instructions for the start of copying is given (NO in #2). After the instructions for starting is issued (YES in #2), an original reading process (#3), a compression process (#4), an expansion process including synthesizing of images (#5), a printing delay process (#6), a mode changing process (#7), and a printing process (#8) are successively carried out, and these processes are repeated until the copying operation is completed (NO in #9). When the copying is completed (YES in #9), the process returns to #2, and waits for instruction to start copying.

Figure 7:
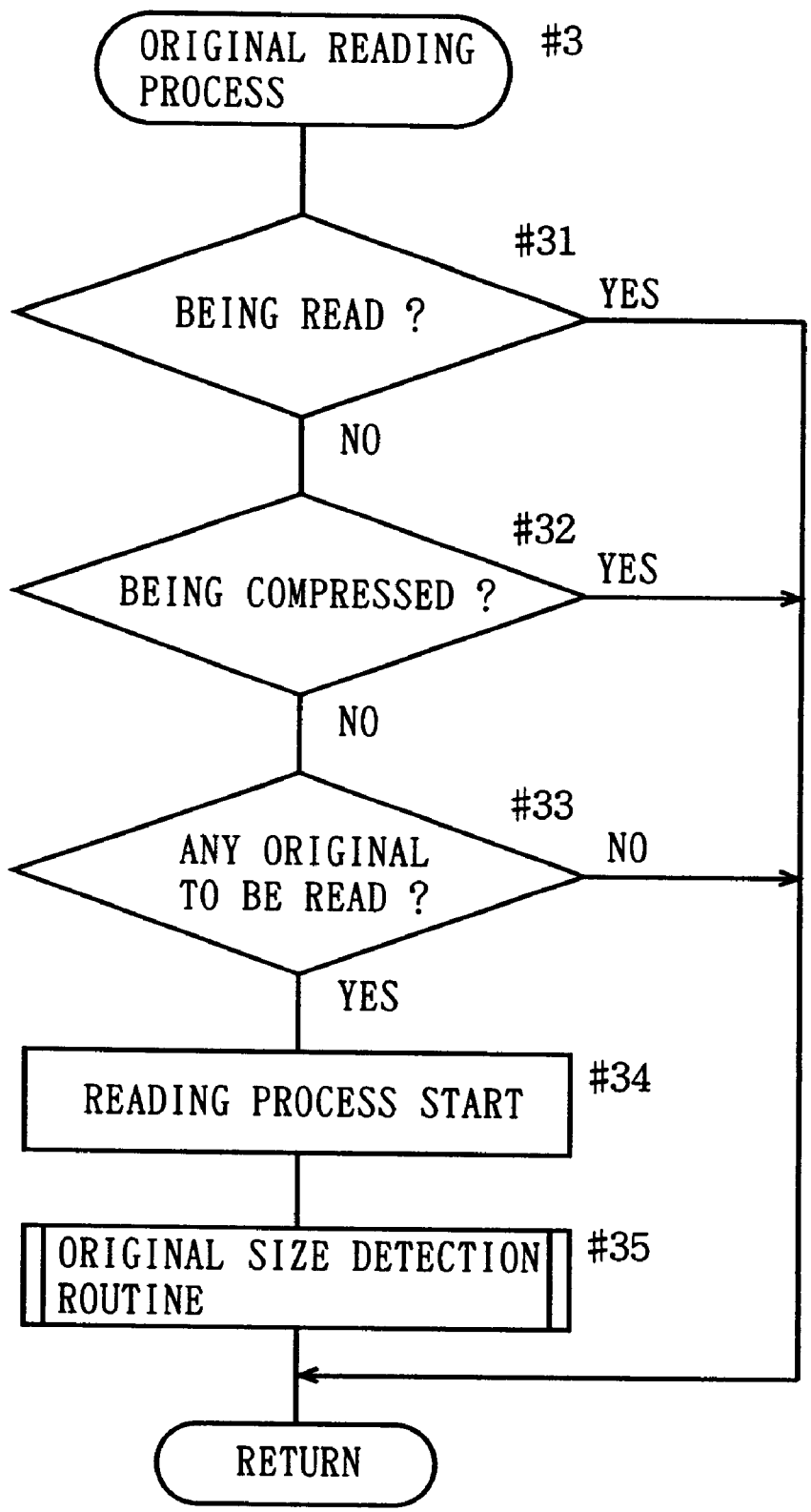
FIG. 7 is a flow chart showing a routine of an original reading process.

FIG. 7 is a flow chart showing details of a process for reading an original shown in #3 of FIG. 6. Referring to FIG. 7, first whether an original is being read or not is determined (#31). When an image is transferred from image reader unit 11 to the input image memory of image memory unit 12 (YES in #31), the process returns to the main routine. If an original is not being read (NO in #31), the reading process is started (#34) when the compression process does not proceeding (NO in #31) and there is an original to be read (YES in #33). In the reading process, DMAC 27 is started, and a reading request is made to image reader unit 11 through control signal line 14. After the start of reading process, transport of an original is started and the size of the original is detected (#35).

Figure 8:
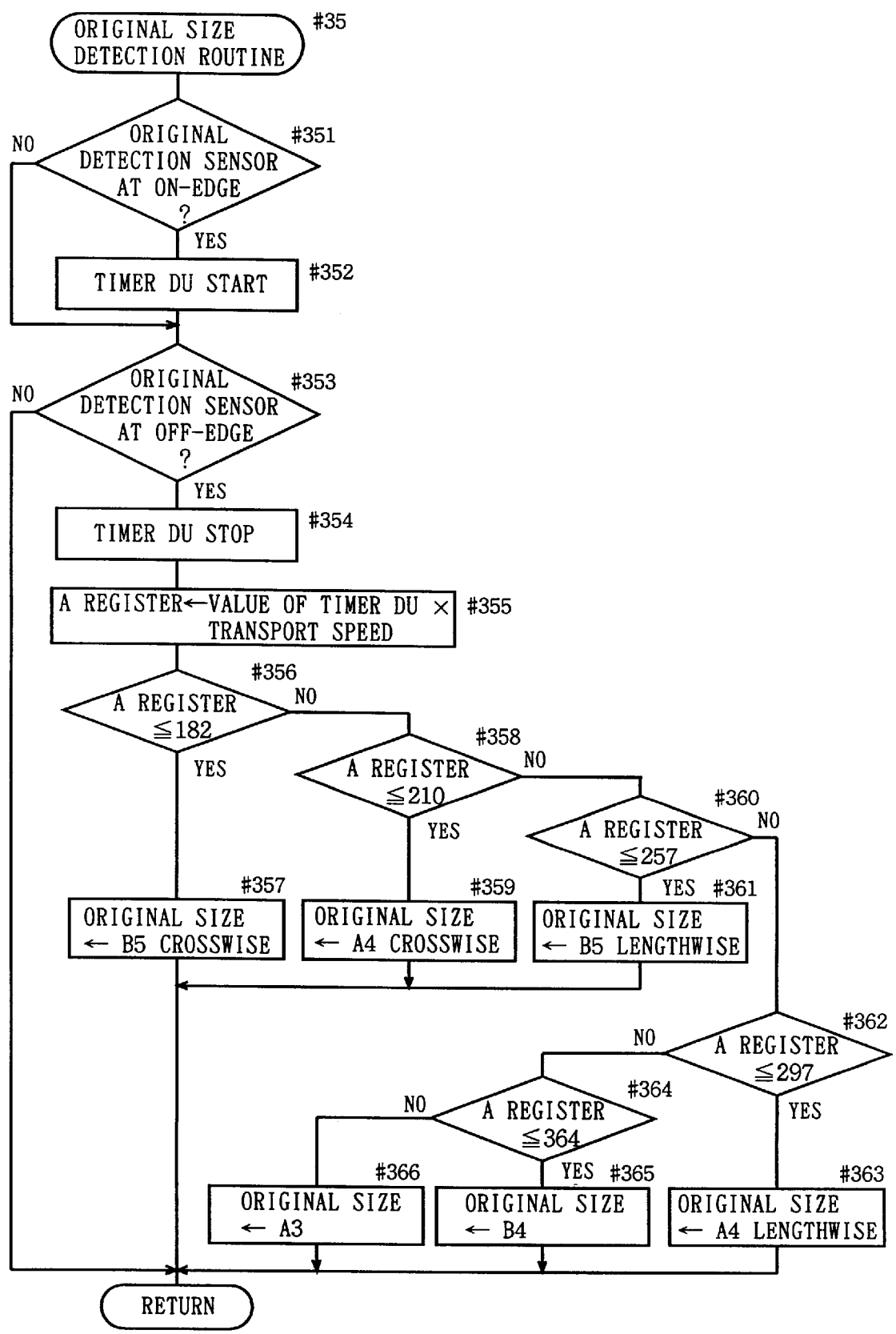
FIG. 8 is a flow chart showing details of a routine of an original size detection.

FIG. 8 is a flow chart showing a routine of detecting the size of an original shown in #35 of FIG. 7. Referring to FIG. 8, a timer DU is started (#352) when original detection sensor SE51 is at on-edge (when the sensor is at the moment of changing from off to on) (YES in #351) in the original size detection routine. Next at off-edge of original detection sensor SE51, that is, when a trailing edge of an original passes the sensor (#353), timer DU is stopped (#354). A value obtained by multiplying the value of the timer at this time by the speed of transport of the original, that is, the length of the original is stored in an A register (#355). If the value stored in the A register is 182 mm or less (YES in #356), the size of the original is determined to be B5 crosswise (#357). If the value is 210 mm or less (YES in #358), the original size is determined to be A4 crosswise (#359). If the value is 257 mm or less (YES in #360), the size is determined to be B5 lengthwise (#361). If the value is 297 mm or less (YES in #362), the size is determined to be A4 lengthwise (YES in #364), if 364 mm or less (YES in #364), the size is determined to be B4 (#365). If the value exceeds 364 mm (NO in #364), the size is determined to be A3 (#366).

The transport of the original is stopped when a prescribed time passes after the off-edge of original detection sensor SE51, and the original is transferred to a prescribed position on platen glass 818. Although the size of the original is detected here based on the length of the original in the direction of transport, the size may be detected by determining the amount in the direction of the width.

Figure 9:
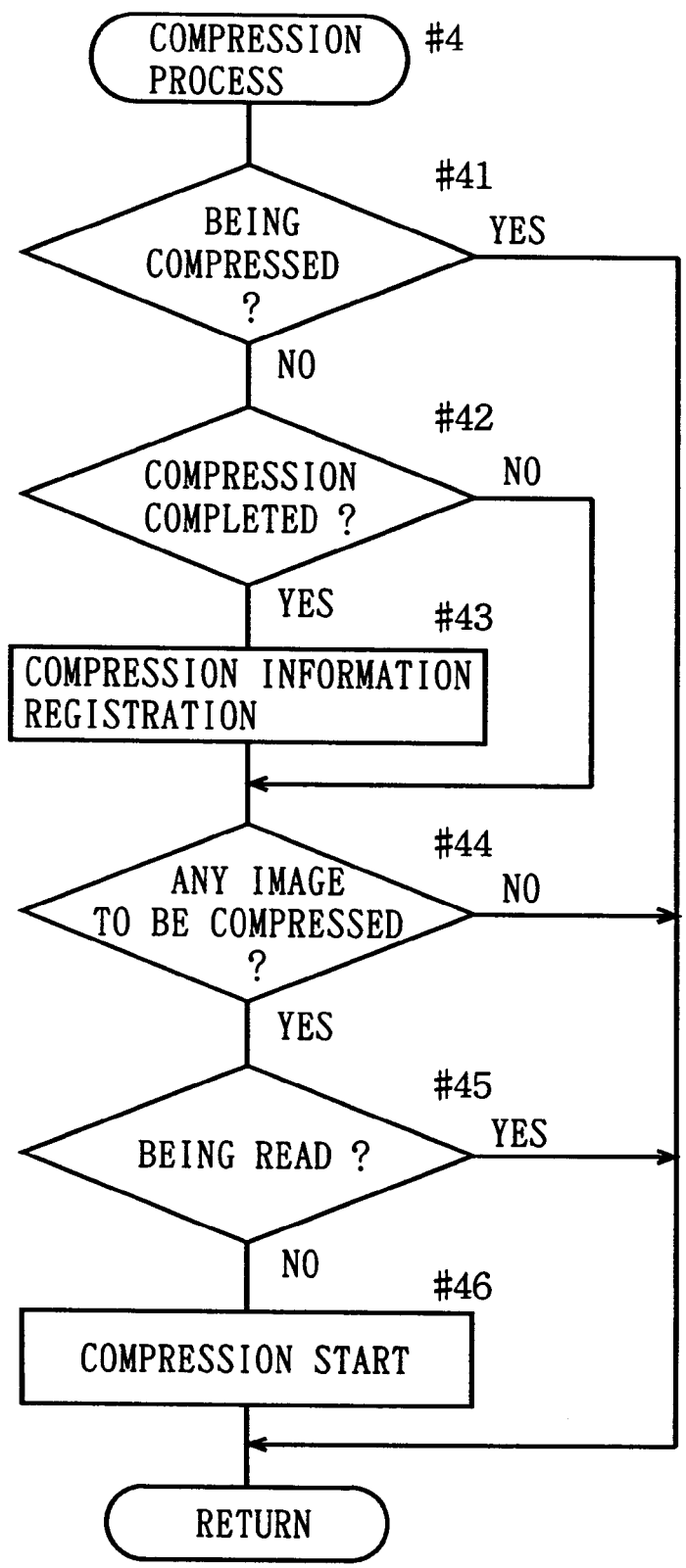
FIG. 9 is a flow chart showing details of a compression process.

Next the compression process indicated by #4 in FIG. 6 is described. Referring to FIG. 9, first it is confirmed that the compression does not proceed (#41). At this time, if the compression has just been completed (YES in #42), compression information on a compressed image is registered in the compression image management table described above (#43). If there is any image to be compressed (#44), it is confirmed that the reading operation does not proceed (NO in #45), and compression of an image is started (#46). If the reading operation proceeds (YES in #45), the process returns to the main routine without executing further process.

In this compression operation, compressor 28 is operated while an image in the input image memory is supplied to compressor 28, and a compressed image is transferred to compressed image memory 263. The image is transferred by DMAC 27. The amount of read images which has been transferred to the input image memory can be known by confirming a transfer counter of DMAC 27.

Figure 10:
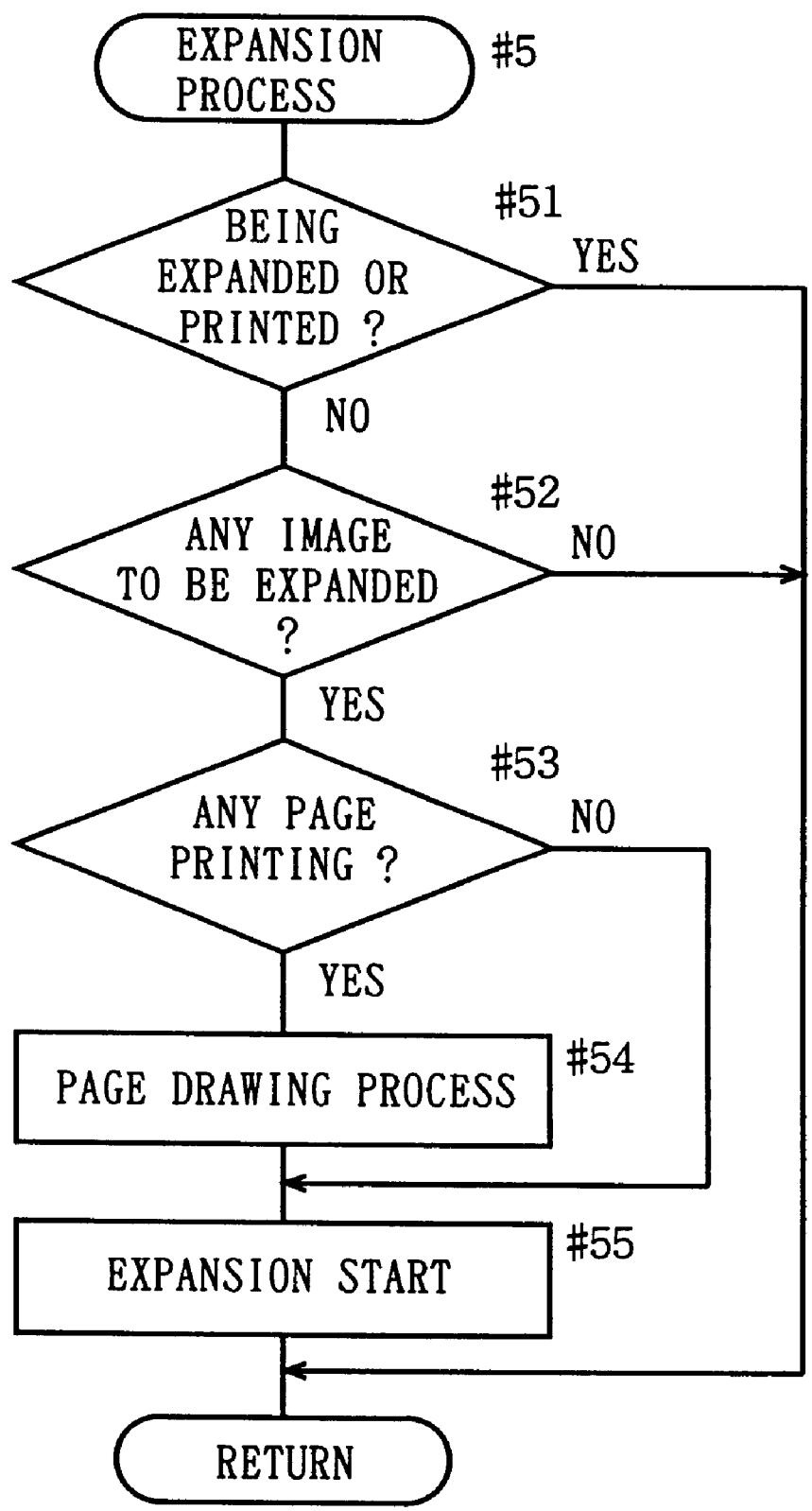
FIG. 10 is a flow chart showing details of an expansion process.

With reference to FIG. 10, the expansion process shown in #5 of FIG. 6 is described below. Referring to FIG. 10, first it is confirmed that the expansion or printing operation does not proceed (#51), and presence of an image to be expanded is confirmed using the compression image management table (#52). If there is any image to be expanded (YES in #52), it is determined whether it is a page printing mode or not (#53). If the process is in the page printing mode (YES in #53), the number of a corresponding page is drawn in an output page memory by referring to the image management table (#54). The expansion processes is thereafter started (#55).

The expansion process is carried out by starting expander 29. The transfer of an image is carried out by DMAC 27. When an image is transferred to the output image memory, if the process is in the page printing mode, an expanded image is superimposed on the output image memory.

Figure 11:
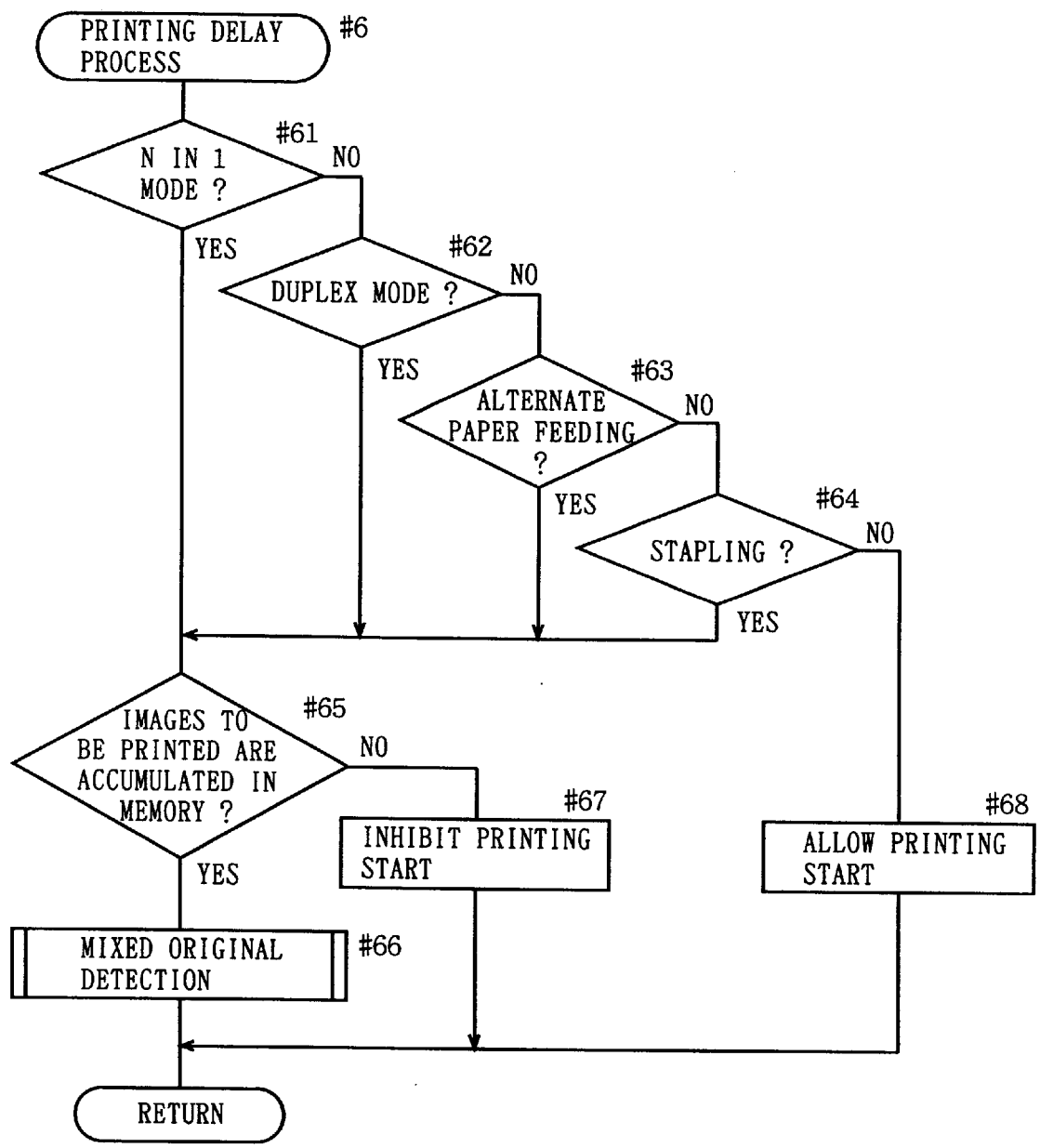
FIG. 11 is a flow chart showing details of a printing delay process.

FIG. 11 is a flow chart showing details of the printing delay process shown in #6 of FIG. 6. Referring to FIG. 11, it is first determined whether the set mode is a specific mode such as the N in 1 mode, the duplex mode, the alternate paper feeding mode, or the stapling mode (#61–#64). If the set mode is determined to be a specific mode (YES in #61–#64), whether or not images to be printed are accumulated in the memory is determined in #65. If the images are not accumulated (NO in #65), the start of printing is inhibited (#670) as described with reference to FIG. 12, and the process waits until images to be printed are accumulated in the memory. In other words, if a specific mode is set, printing is delayed until images to be printed are accumulated.

In #65, if images to be printed are accumulated in the memory (YES in #65), a subroutine of detecting mixed originals is started (#66).

If a specific mode is not set (NO in #61–64), start of printing is allowed (#68).

Next a process of detecting mixed originals shown in #66 of FIG. 11 is described.

Figure 12:
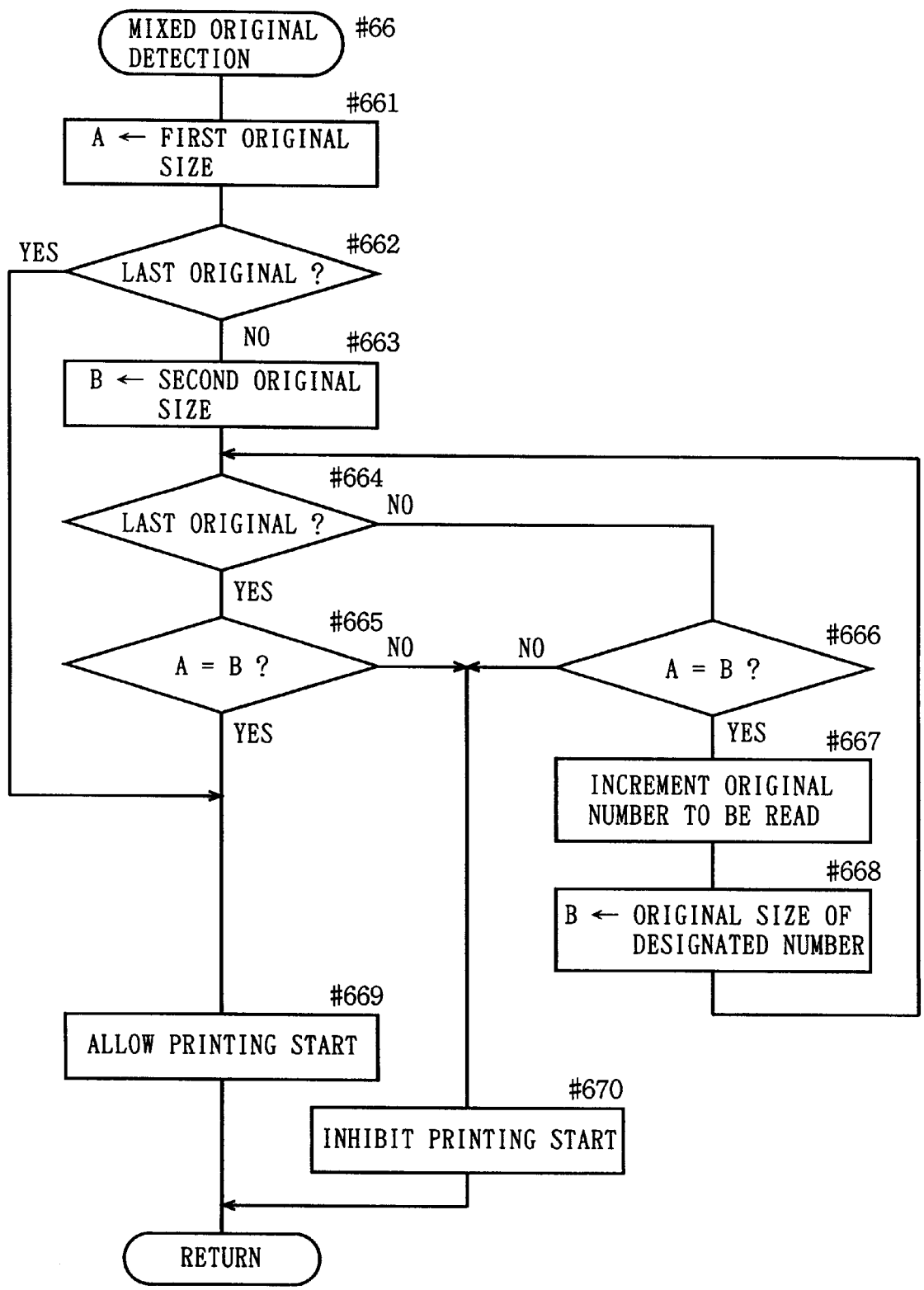
FIG. 12 is a flow chart showing details of a routine of a mixed original detection.

FIG. 12 is a flow chart showing details of a routine of detecting mixed originals. Referring to FIG. 12, first the size of the first original is read from compressed image memory 263 (#661). Next whether or not the number of read original is one, that is, whether the original is the last one or not is determined from the content of compressed image memory 263 (#662). If the result is YES in #662, that is, if the number of read original is one, it is determined that originals are not of assorted sizes, and start of printing is allowed (#669). This determination of mixed originals is based on a principle that "when the number of read originals is two or more, if the originals have different sizes, the originals are mixed ones." In other words, if it is determined that the number of read originals is less than two in #662, no problem occurs when the operation proceeds in the way similar to that for the non-mixed originals.

When the original is determined not to be the last one (NO in #662), the size of the second original is input into a B register (#663). The size of the first original stored in the A register is compared with the sizes of the second, the third, the fourth, . . . the nth originals stored in the B register successively until the original is determined to be the last one to the processes of #664, #666–#668. The comparison process is repeated until it is found that the size of the first original in the A register and the size of the nth original in the B register differ from each other (#666).

If the result of #666 is NO, start of the printing is inhibited without comparing the size of the last original (#670). Therefore, when #665 is carried out, the size of the first original is the same as that of all other originals except for the last original.

In #665, it is determined whether or not the size of all originals is identical to that of the first original as in #666. If it is determined that the size of all originals is the same one (YES in #665), originals are determined to be "non-mixed originals" since the size of all originals is identical to that of the first one, and start of printing is allowed (#669).

If the result of #665 is NO, it means that "originals immediately before the last original have the size identical to the size of the first original and only the size of the last original differs from the size of other originals." In this case, originals are determined to be mixed originals, and start of printing is inhibited (#670).

Figure 13:
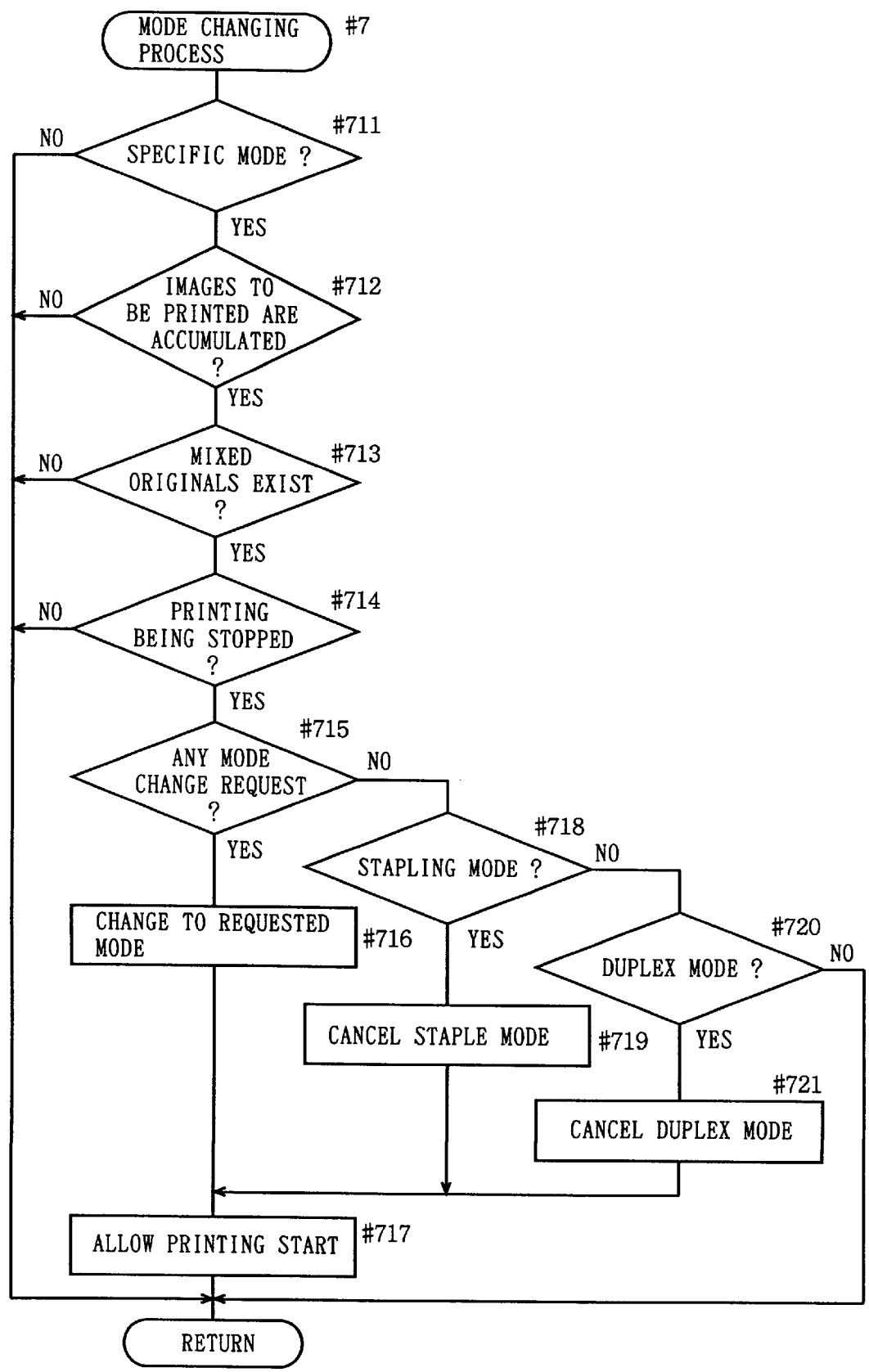
FIG. 13 is a flow chart showing one embodiment of a mode changing process.

Next the mode changing process shown in #7 of FIG. 6 is described. FIG. 13 is a flow chart showing details of the mode changing process. Referring to FIG. 13, whether or not any of the specific modes shown in #61–#64 of FIG. 11 is set is determined (#711). If it is determined that a specific mode is set (YES in #711), whether or not images to be printed are accumulated in the memory is determined (#712). If it is determined that images to be printed are accumulated (YES in #712), whether or not there are mixed originals is determined (#713), and whether or not printing is stopped is determined (#714).

If the conditions described above are all satisfied (YES in #711–#714), whether or not a mode changing request is made from an operation panel provided for a printer or an external input device (not shown) is determined (#715). If a mode changing request is made(YES in #715), the mode is changed to the requested mode other than the specific modes described above (#716). Start of printing is next allowed (#717). By allowing start of printing in #717, inhibition of the start of printing set in #670 of FIG. 12 is canceled. As a result, digital copying machine 1 starts the stopped printing operation in a mode corresponding to the request for changing the mode in #715.

Specifically, for example, suppose that the copying a machine stops printing operation since the duplex copying mode is set and originals having images that have been read are mixed ones. In this case, a user cancels the duplex mode which cannot be carried out when originals are of assorted sizes (no duplex mode), and images accumulated in the memory are printed.

If there is no request for changing a mode (NO in #715), it is determined whether or not a specific mode such as the stapling mode or the duplex mode is set (#718, #720). If the specific mode is set (YES in #718, #720), digital copying machine 1 automatically changes the mode respectively (#719, #721), and start of printing is allowed (#717).

If no request for changing a mode is made in #715, the stapling mode is not set, and the duplex mode is not set (NO in #718, 720), the process returns to the main routine and the printing operation is stopped until the mode changing request is made.

Figure 14:
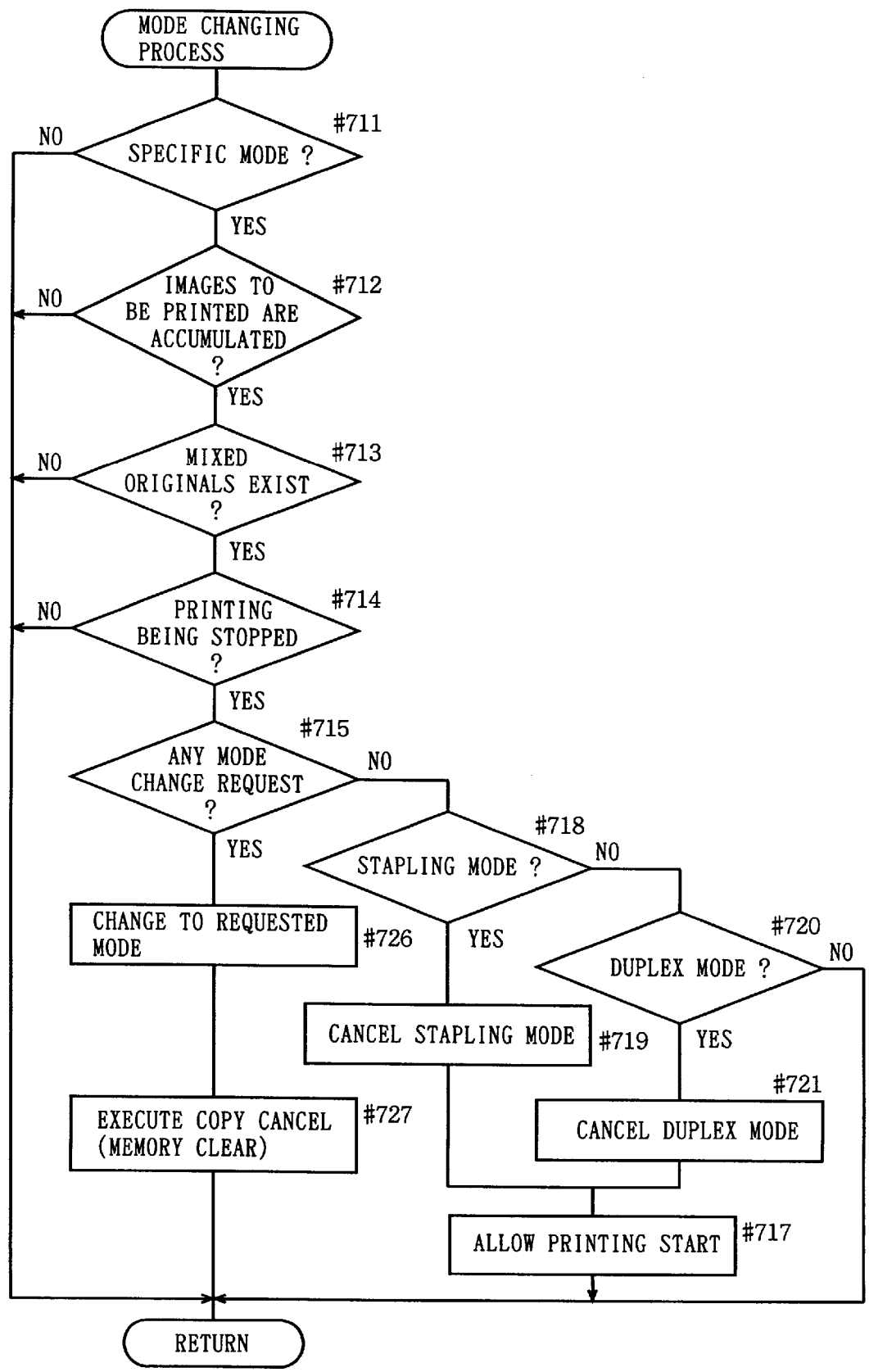
FIG. 14 is a flow chart showing another embodiment of the mode changing process.

FIG. 14 is a flow chart showing another embodiment of the mode changing process. Referring to FIG. 14, the only difference between the mode changing process according to this embodiment and that shown in FIG. 13 is #726 and #727. Other processes are similar to the embodiment described above, and description thereof is omitted.

With reference to FIG. 14, according to this embodiment, when a mode changing request is made (YES in #715), the mode is changed to the requested mode (#726), and image data stored in the image memory is cleared (#727). If a mode changing request is made when a specific mode is designated and printing operation is stopped due to presence of mixed originals, the mode is changed to the requested mode.

When the N in 1 mode reduced an image to be copied is reduced in size. In this case, a prescribed amount of data is skipped and remaining image data is stored in the image memory. Since the normal copying operation is impossible from this data, the image data is cleared.

Figure 15:
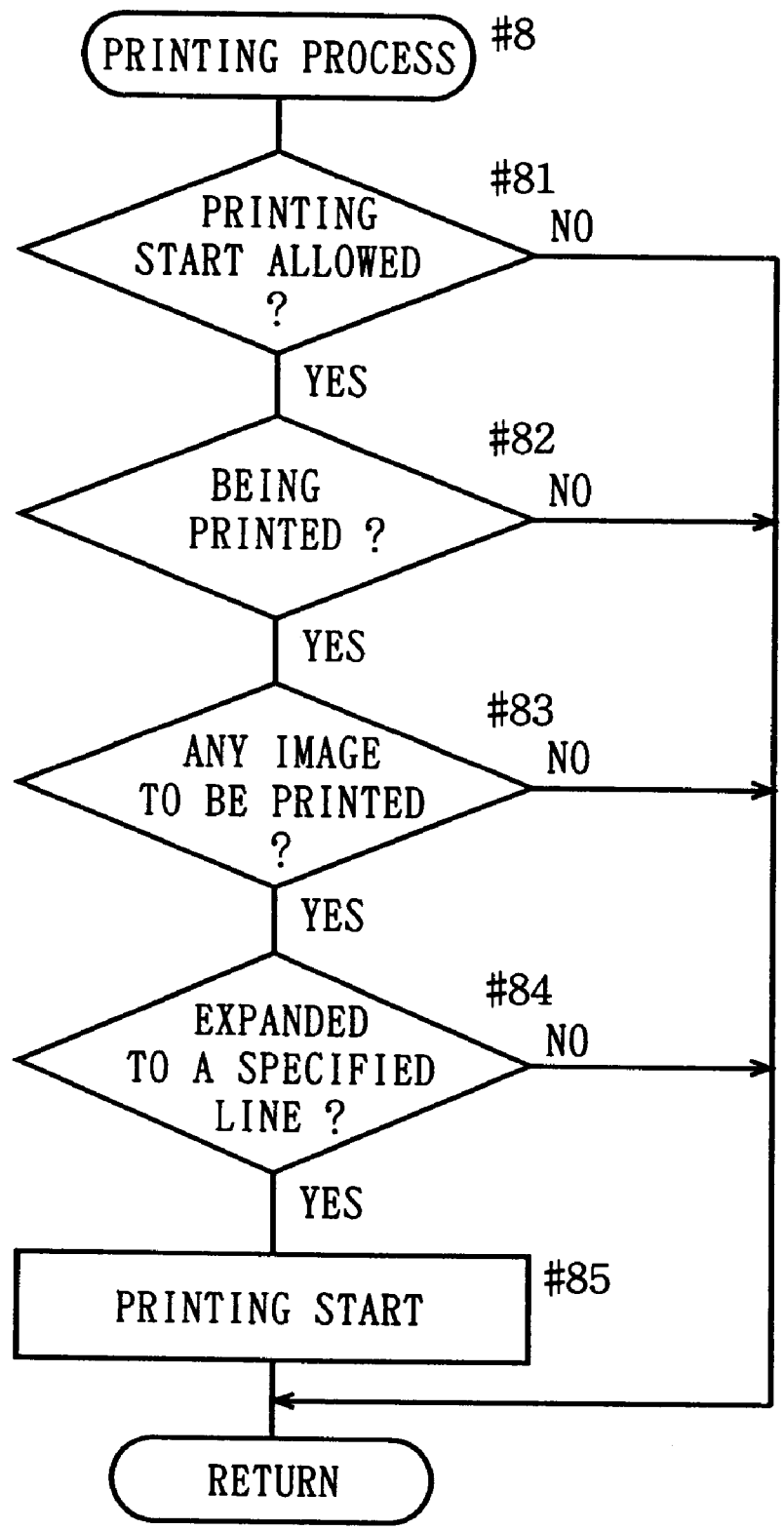
FIG. 15 is a flow chart showing details of a printing process.

FIG. 15 is a flow chart showing details of the printing process shown in #8 of FIG. 6. In this printing process, whether or not start of printing is allowed is determined (#81). When the start of printing is allowed, if there is an image to be printed and the image is expanded to a specified line, printing is started (#82–#85).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   an input unit which inputs images of at least one original;
   a memory which stores the images input from said input unit;
   a detection unit which detects sizes of the originals;
   an output unit which outputs the images stored in said memory;
   a setting unit which sets a first mode and a second mode for said output unit; and
   a controller which controls an operation of said output unit based on whether said detection unit detects originals of different sizes and a mode set by said setting unit.

2. An image forming apparatus comprising:
   an input unit which inputs an image of an original;
   a memory which stores an image input from said input unit;
   a detection unit which detects a size of an input original;
   an output unit which outputs an image stored in said memory;
   a setting unit which sets a first mode and a second mode for said output unit; and
   a controller which controls an operation of said output unit based on a result of detection by said detection unit and a mode set by said setting unit; and
   wherein said controller stops an operation of said output unit until sizes of all input originals are detected by said detection unit when said second mode which relates to a specific process is set.

3. The image forming apparatus according to claim 2, wherein
   said controller starts an operation of said output unit when sizes of all originals detected by said detection unit are equivalent to each other.

4. The image forming apparatus according to claim 2, wherein
   said controller stops, when said detection unit detects sizes of a plurality of originals, an operation of said output unit even after the sizes of originals are detected, and allows said setting unit to change a mode.

5. The image forming apparatus according to claim 4, wherein
   an image stored in said memory is discarded if said set mode is changed when an operation of said output unit is stopped by said controller.

6. The image forming apparatus according to claim 2, wherein
   said controller starts an operation of said output unit without waiting for detection of sizes of all input originals when said first mode which does not relate to said specific process is set.

7. The image forming apparatus according to claim 1, wherein
   said setting unit is capable of setting a third mode,
   said controller stops an operation of said output unit until sizes of all input originals are detected by said detection unit when said third mode is set, and changes a mode to said first mode and starts an operation of said output unit when detected sizes of all originals are not equivalent to each other.

8. The image forming apparatus according to claim 1, wherein
   said input unit is an image reader.

9. The image forming apparatus according to claim 1, wherein
said input unit receives image data from an externally placed device.

10. A method of forming an image comprising the steps of:
accepting setting of a first mode or a second mode;
inputting an image of an original;
storing an input image in a memory;
outputting images stored in the memory successively when said first mode is set; and
stopping output of an image until sizes of all originals for input images are detected when said second mode is set.

11. The method of forming an image according to claim 10, further comprising the step of accepting change of a mode while stopping output of an image if images that are input when said second mode is set have a plurality of sizes.

12. The method of forming an image according to claim 10, further comprising the step of changing a mode to said first mode and starting output of an image if images that are input when said second mode is set have a plurality of sizes.

13. An image forming apparatus comprising:
an original tray that stacks a plurality of originals;
an image reader that reads the originals stacked on the original tray, and outputs image data;
a memory that stores the image data output from the image reader;
a detector that detects a size of the originals stacked on the original tray;
an image forming unit that forms an image on a recording medium based on the image data stored in the memory; and
a controller that sets the image forming unit to a first mode when all of the originals stacked on the original tray are of an equal size, and sets the image forming unit to a second mode when the originals stacked on the original tray are of different sizes.

* * * * *